United States Patent
Cobb

(10) Patent No.: US 11,634,067 B2
(45) Date of Patent: *Apr. 25, 2023

(54) LOW PROFILE REAR LAMP APPLIQUE ASSEMBLY

(71) Applicant: Magna Exteriors Inc., Concord (CA)

(72) Inventor: Brian M. Cobb, Bloomfield Hills, MI (US)

(73) Assignee: Magna Exteriors Inc., Concord (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/525,539

(22) Filed: Nov. 12, 2021

(65) Prior Publication Data

US 2022/0063483 A1 Mar. 3, 2022

Related U.S. Application Data

(63) Continuation of application No. 16/977,922, filed as application No. PCT/IB2019/051827 on Mar. 6, 2019, now Pat. No. 11,203,285.

(Continued)

(51) Int. Cl.
| | |
|---|---|
| *B60Q 1/30* | (2006.01) |
| *B60J 5/10* | (2006.01) |
| *B60Q 1/00* | (2006.01) |
| *B60Q 1/26* | (2006.01) |
| *B60R 16/02* | (2006.01) |
| *F21V 3/00* | (2015.01) |
| *F21V 21/34* | (2006.01) |
| *F21V 23/06* | (2006.01) |

(Continued)

(52) U.S. Cl.
CPC .............. *B60Q 1/30* (2013.01); *B60J 5/10* (2013.01); *B60Q 1/0094* (2013.01); *B60Q 1/263* (2013.01); *B60Q 1/2653* (2013.01); *B60Q 1/2696* (2013.01); *B60R 16/0215* (2013.01); *F21S 43/14* (2018.01); *F21S 43/31* (2018.01); *F21V 3/00* (2013.01); *F21V 21/34* (2013.01); *F21V 23/06* (2013.01); *H01R 13/5219* (2013.01); *F21Y 2115/10* (2016.08); *H01R 2201/26* (2013.01)

(58) Field of Classification Search
CPC ........ B60Q 1/30; B60Q 1/263; B60Q 1/2653; B60Q 1/2696; F21S 43/14; F21S 43/31
See application file for complete search history.

(56) References Cited

U.S. PATENT DOCUMENTS

| | | | | |
|---|---|---|---|---|
| 4,831,503 A | * | 5/1989 | DeSantis | .............. B60Q 1/2607 362/240 |
| 5,394,311 A | * | 2/1995 | Asano | ..................... B60Q 1/26 362/496 |

(Continued)

*Primary Examiner* — William N Harris
(74) *Attorney, Agent, or Firm* — Warn Partners, P.C.

(57) ABSTRACT

A rear liftgate assembly with at least one rear lamp applique assembly and process for manufacturing same. The lamp applique assembly includes a rear lamp applique housing with at least one attachment surface for attaching to an outer panel of the liftgate assembly. A plurality of integrated snap attachment features are provided to connect the lamp applique assembly to the outer panel, thereby eliminating additional bonding and fasteners. A self-sealing wire harness connected accepts an integrated lamp connector, thereby eliminating the need for access openings, to further minimize water intrusion, and eliminate gaskets.

19 Claims, 9 Drawing Sheets

Related U.S. Application Data

(60) Provisional application No. 62/757,527, filed on Nov. 8, 2018, provisional application No. 62/639,268, filed on Mar. 6, 2018.

(51) Int. Cl.
*H01R 13/52* (2006.01)
*F21S 43/14* (2018.01)
*F21S 43/31* (2018.01)
*F21Y 115/10* (2016.01)

(56) References Cited

U.S. PATENT DOCUMENTS

| | | | |
|---|---|---|---|
| 9,586,519 B1 * | 3/2017 | Salter | B60Q 1/24 |
| 10,215,360 B1 * | 2/2019 | Grogan | F21S 43/40 |
| 10,246,006 B1 * | 4/2019 | Stowell | B60Q 1/2669 |
| 10,549,679 B1 * | 2/2020 | Ekladyous | B60Q 1/263 |
| 2002/0085389 A1 * | 7/2002 | Cheron | B60Q 1/0491 |
| | | | 362/267 |
| 2003/0043592 A1 * | 3/2003 | Skirha, III | B60Q 1/0458 |
| | | | 362/546 |
| 2004/0184278 A1 * | 9/2004 | Cheron | B60Q 1/2653 |
| | | | 362/505 |
| 2006/0092658 A1 * | 5/2006 | Scholz | B60Q 1/2653 |
| | | | 362/540 |
| 2010/0149826 A1 * | 6/2010 | Leese | B60Q 1/2607 |
| | | | 362/485 |
| 2013/0182450 A1 * | 7/2013 | Buisson | F21S 43/14 |
| | | | 362/487 |
| 2018/0056762 A1 * | 3/2018 | Adachi | B60J 5/107 |
| 2018/0154746 A1 * | 6/2018 | Lee | B29C 65/48 |
| 2018/0222381 A1 * | 8/2018 | Johnson | B60Q 1/0041 |
| 2019/0315267 A1 * | 10/2019 | Salter | F21V 9/30 |
| 2020/0248987 A1 * | 8/2020 | Salter | F21S 43/26 |

* cited by examiner

LOW PROFILE REAR LAMP APPLIQUE ASSEMBLY

CROSS-REFERENCE TO RELATED APPLICATIONS

This application is a continuation of U.S. patent application Ser. No. 16/977,922, filed Sep. 3, 2020, which is a National Stage of PCT International Application No. PCT/IB2019/051827, filed Mar. 6, 2019, which claims the benefit of U.S. Provisional Patent Application No. 62/639,268, filed Mar. 6, 2018 and U.S. Provisional Patent Application No. 62/757,527, filed Nov. 8, 2018. The entire disclosures of the above applications are incorporated herein by reference.

FIELD OF THE INVENTION

The present invention relates to a low profile lamp pocket. In particular, to a liftgate module with adhesively bonded rear lamp appliqué assembly.

BACKGROUND OF THE INVENTION

Attempts have been made to optimize connecting lamp assemblies to liftgate structures. However, there are issues with fastener, locator, and sealing infringment on the liftgate inner panel structure. Currently, a known lamp subassembly itself, along with final lamp assembly to the liftgate, requires multiple purchased fasteners. The current lamp subassembly itself, along with final assembly to the liftgate, also requires multiple sealing gaskets to maintain water tight sealing within the lamp and to the liftgate closure. These have several disadvantages, including, increased cost, material handling, complexity, part weight and assembly steps.

Therefore there remains a need in the art for a design that includes the elimination of added fasteners, locator pins and sealing gaskets.

SUMMARY OF THE INVENTION

The present invention provides an integrally bonded design that eliminates or reduces cost, mass and the labor to assemble multiple gaskets. The present invention also allows for the use of cost effective manufacturing methods that allows for adhesive bonding attachment that can be robotically controlled to maintain dimensional integrity while providing necessary component retention as well as water tight sealing for lamp component and liftgate assembly.

In accordance with a preferred embodiment of the present invention, an exemplary attachment includes a fully snapped attached lamp without the need for adhesive or fasteners. In addition, there is provided a self-engaging electrical lamp electrical connector to liftgate. Thus, there is no need for hand access holes to connect a loose wire harness to the lamp.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
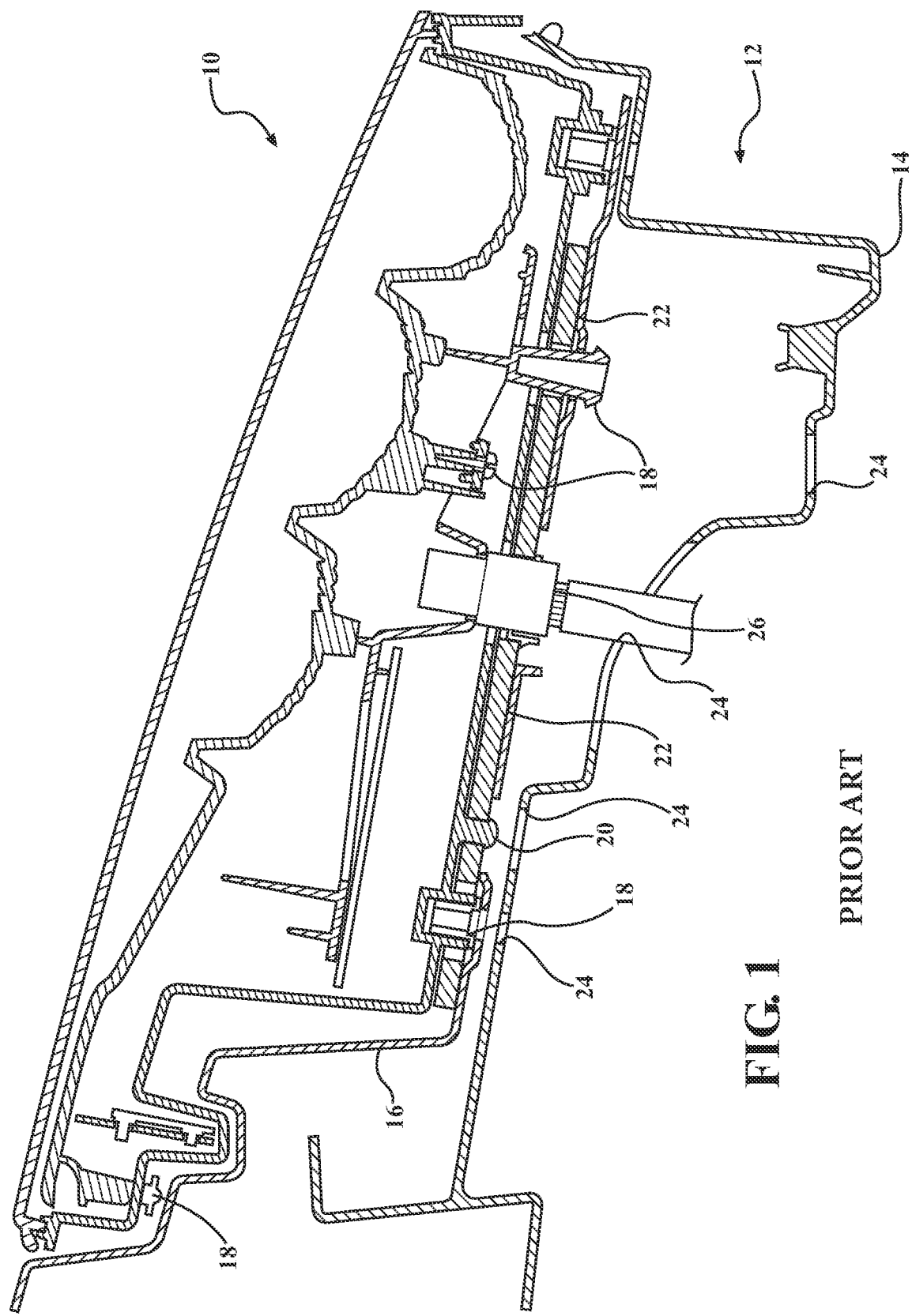
FIG. 1 is a cross sectional view of a conventional rear lamp appliqué assembly connected to a liftgate assembly.
Figure 2:
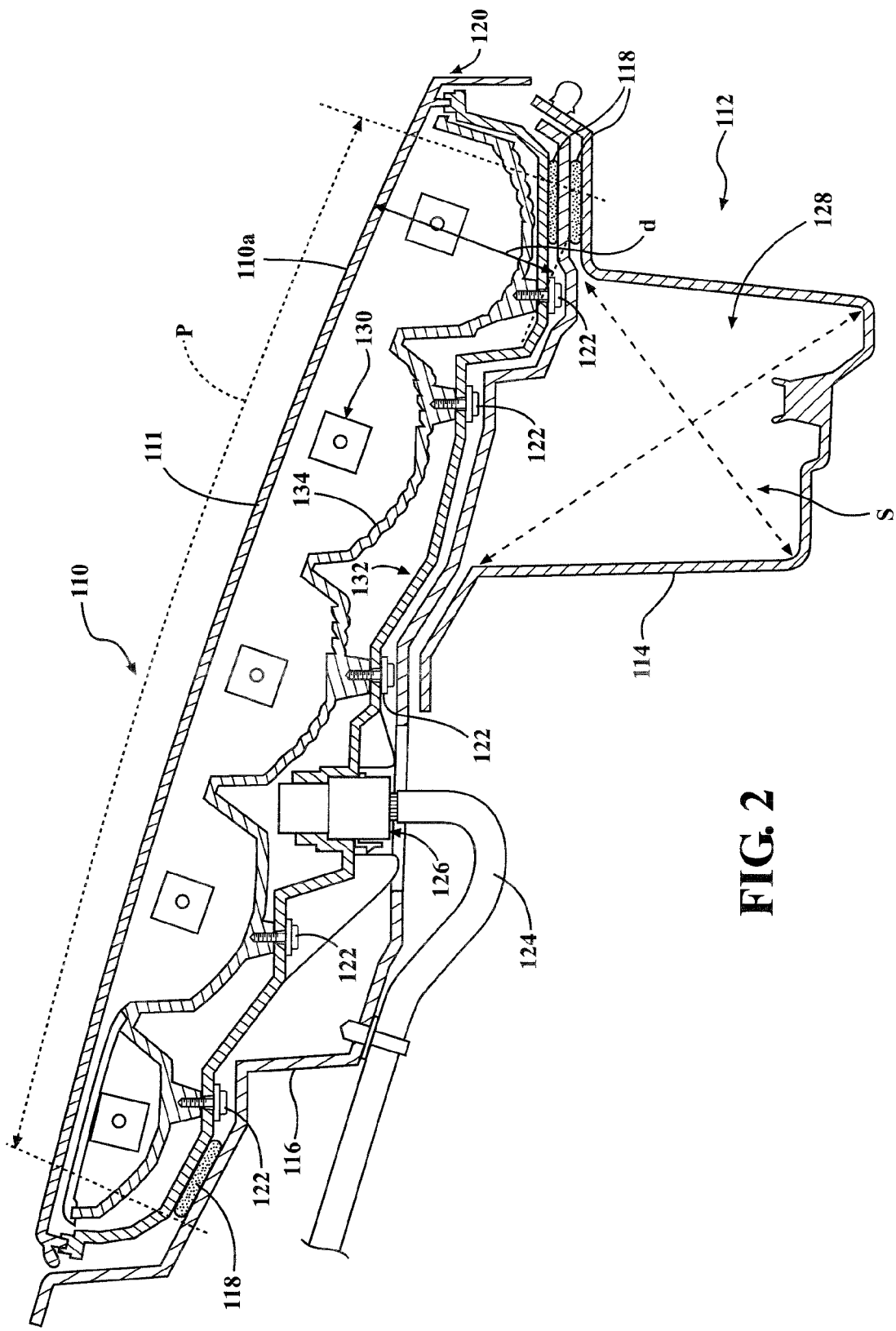
FIG. 2 is a cross sectional view of a rear lamp appliqué assembly connected to a liftgate assembly, in accordance with the present invention.

FIG. 1 illustrates a conventional rear lamp appliqué assembly shown generally at 10 attached to a liftgate assembly, shown generally at 12, that includes an inner panel 14 and an outer panel 16. The assembly 10 has a plurality of threaded attachments 18, clips 18, datum pins 20, and adhesive backed foam sealing gaskets 22 (it is understood that more or less and other locations can be present), which also disadvantageously drive a deeper overall depth than the present invention and require access areas 24 or openings for connector 26 access, which decreases stiffness of the liftgate assembly 12.

Lamp assemblies generally take away from the path of a D-pillar and strength for the liftgate leading down to the rear liftgate latch. Access areas for attachment also decrease stiffness. Conventional lamps require access panels to be able to access the connector and that is an important structural area of the liftgate. OEMs generally require predetermined stiffness requires of liftgates. Referring to FIGS. 2-11 generally, it is desired to minimize the depth of the lamp assembly and still provide areas for lamp attachments. In addition, the present invention allows active connecting of the connector done with the assembly of the lamp into position relative to the liftgate.

Preferably, the inner panel is injection molded and bonded to the outer panel, e.g., bonded by adhesive. The outer panel needs to find or locate an electrical connector during assembly. Infrared welding and ultrasonic welding require masking to then paint. Typically, the outer panel is polycarbonate. Preferably, the liftgate is a composite liftgate.

Referring now to FIGS. 2-5 generally, and more particularly to FIGS. 2-5 generally, the present invention provides a rear lamp applique housing with at least one adhesive bonding surface, provides at least one adhesive bond track, and a rear liftgate outer panel with at least one mating adhesive bonding surface. The present invention eliminates added fasteners, locator pins and sealing gaskets. There is provided a rear lamp appliqué assembly shown generally at 110, in accordance with the present invention, attached to a liftgate assembly, shown generally at 112, that includes an inner panel 114 and an outer panel 116. The rear lamp appliqué assembly 110 is adhesively bonded to the liftgate outer panel 116, such as by adhesive indicated at 118. Adhesive bonding of the rear lamp appliqué assembly 110 provides both attachment and water tight sealing within the periphery of bond path indicated at 'P'.

The rear lamp appliqué assembly 110 is also preferably positioned within a pocket, indicated generally at 120, to optimize fit to the liftgate assembly 112. Most preferably, the rear lamp appliqué assembly 110 is positioned within the pocket 120 robotically to optimize fit to the liftgate assembly 112. Generally, the depth (indicated at 'd') is minimized from the outer panel 116 surface or inner panel 114 surface, e.g., an A-surface, or assembly 110 surface to allow maximum section depth (e.g., more particularly, maximized section properties, indicated generally at 'S' of the liftgate inner channel shown generally at 128) for the structural inner panel 114 (e.g., the depth is minimized to less than 50 mm, typically, to about 10 to 40 mm, preferably, 18 to 30 mm, more preferably, 20 to 28 mm, most preferably, about 25.0 mm; e.g., the cross section is minimized to less than 50 mm, typically, to about 10 to 40 mm, preferably, 18 to 30 mm, more preferably, 20 to 28 mm, most preferably, about 25.0 mm). Typically, the depth (indicated at 'd') is minimized from the assembly 110 outer surface 110a, e.g., an A-surface, of a lamp lens 111 to allow maximum section depth for the structural inner panel 114 (by way of non-limiting example—generally, the depth is minimized to less than 30 inches, typically, to about 3 to 25 inches, preferably, 4 to 12 inches, more preferably, less than 10 inches, most preferably, not more than 8 inches. Preferably, the depth 'd' is minimized to about 25.0 mm from A-surface to allow maximum section depth for the structural inner panel 114.

A wire harness 124 is operably connected to the lamp assembly 110 at a connecter indicated generally at 126. Alternatively, the connector 126 is a lateral connector. Generally, the rear lamp assembly 110 has at least one suitable predetermined light source indicated generally at 130. Preferably, the rear lamp assembly 110 is a light emitting diode (LED) lamp assembly. At least one reflector 134 is operably connected to at least one lamp housing, indicated generally at 132, preferably, by the plurality of fasteners 122. The liftgate outer panel 116 is operably bonded to the lamp housing 132 and liftgate inner panel 114.

Figure 4:
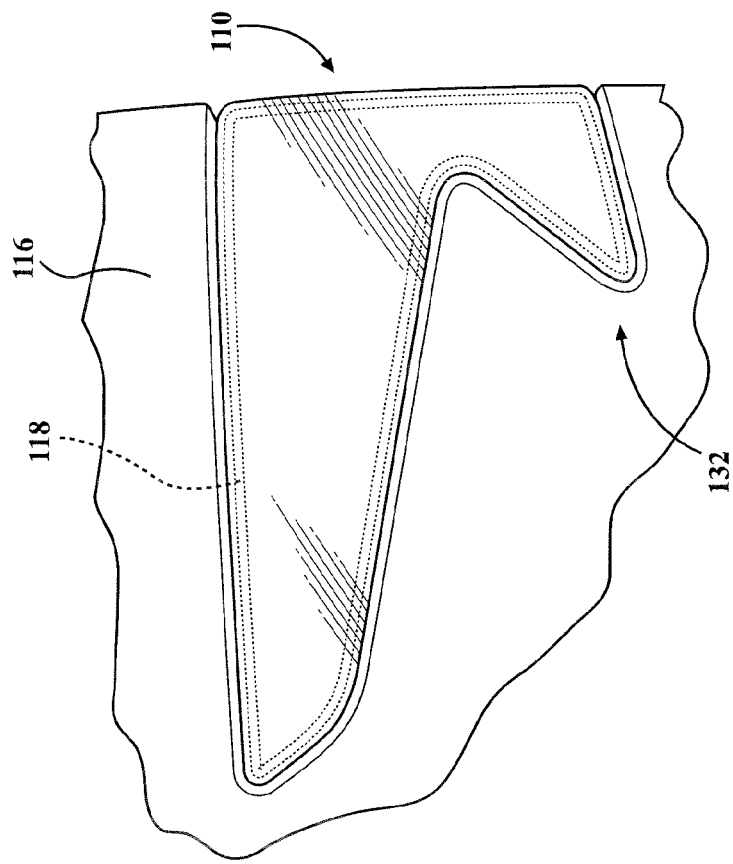
FIG. 4 is a perspective view of the rear lamp appliqué assembly of FIGS. 2-3 bonded to the liftgate assembly, in accordance with the present invention.
Figure 3:
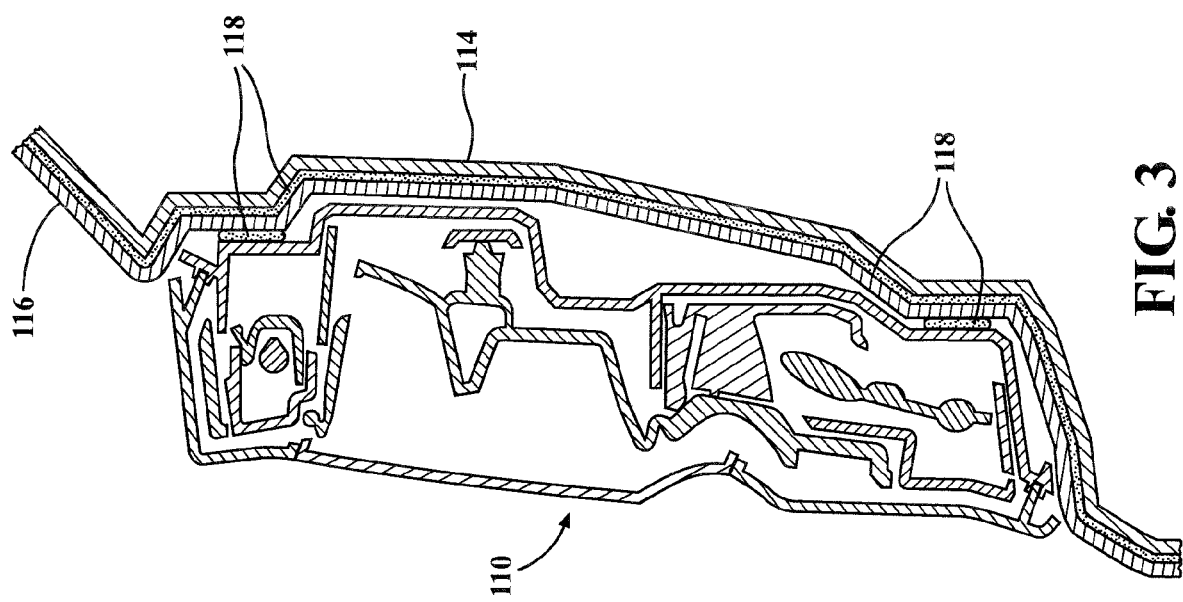
FIG. 3 is a cross sectional view of the rear lamp appliqué assembly of FIG. 2 bonded to the liftgate assembly, in accordance with the present invention.

Referring now more particularly to FIG. 4, adhesively bonding 118 the sealed rear lamp assembly 110 to the liftgate outer panel 116 around the periphery of the assembly 110 housing 132 eliminates the need for additional multiple fasteners and the area within the bond is effectively water tight—thereby also eliminating the need for gaskets.

Figure 5:
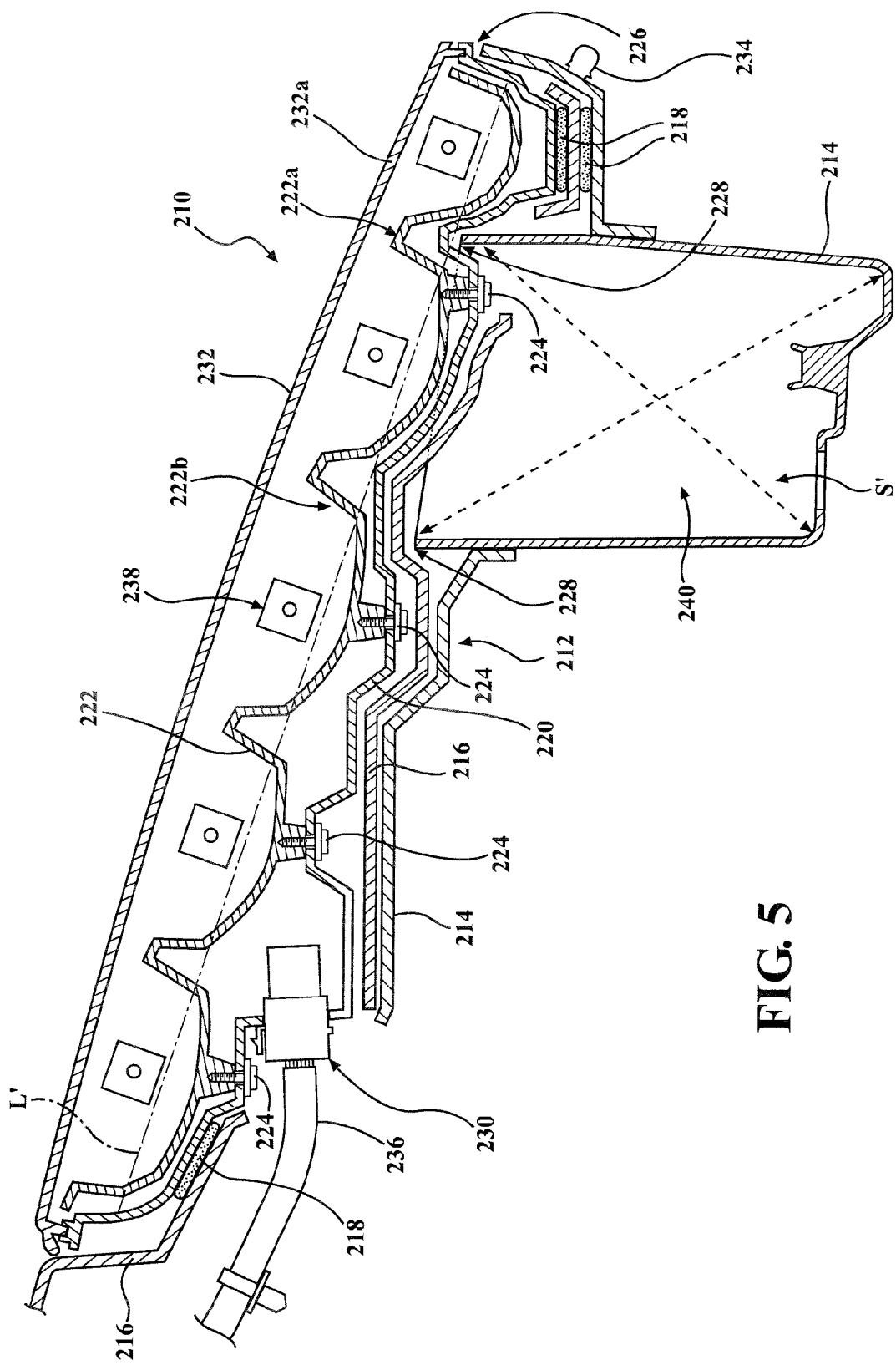
FIG. 5 is a cross sectional view of a rear lamp appliqué assembly connected to a liftgate assembly, in accordance with the present invention.

Referring more particularly to FIG. 5, a rear lamp appliqué assembly shown generally at 210 is connected to a liftgate assembly indicated at 212, providing an extreme shrink wrap arrangement with lateral connector, shown generally at 230. The assembly 210 is coupled to an inner panel 214 and connected to an outer panel 216. A lamp housing 220 is bonded 218, most preferably, adhesive bonded, to the outer panel 216. The outer panel 216 is also connected to the inner panel 214, e.g., bonded with adhesive, infrared welded, ultrasonic, etc., most preferably, adhesive 218. At least one reflector 222 is connected to the lamp housing 220, preferably fastened by a plurality of fasteners 224. The adhesive 218 helps to eliminate water entrapment.

Alternatively, an operable sealing feature is provided, e.g., detent ring, detent ring with integrated seal, angled ring, suitable selectively releasable detent feature etc, on the self-sealing connector 230 to connect the connector 230 to the outer panel 216 and seal there such that the outer panel 216 and connector 430 dictate movement.

There is further indicated generally at 226 reflector at cut-line edge of liftgate in pocket formed between the inner panel 214 web and cover (e.g., lamp lens cover 232 or housing 222) and extended anti pinch sensor 234 mounting surface, thereby providing a clean edge. Extended APS mounting protects the edge of the lamp assembly 210 allowing a more aggressive lit to edge condition. By way of example, the inner panel 214 projects adjacent to the outward edge region of the housing 222. Further, as indicated generally at 228, the inner panel web height is maximized for stiffness by intruding into lamp non-functional volumes generally between or adjacent reflectors 222 (e.g., reflector portions indicated generally at 222a and 222b) for an approximately 100% increase over current design. Generally about 50 mils taken out of the D-pillar. Further indicated generally at 230, liftgate appliqué lamp connector orientation generally in X-Z plane (for a wire harness 236) allows lateral connection and tip in to connect during bonding/joining of the lamp assembly 210 to the liftgate assembly 212. The liftgate side connector 230 and water seal located on features (e.g., adhesive bonds 218) formed in outer and inner panels. The connector 230, preferably, a lateral connector, eliminates any hand access hole and further optimizes the inner panel 214 and space. Alternatively, the connector 230 is within a flange area of the liftgate or "D-ring". Alternatively, integrated connector design where the connector is integrated in the outer panel or the inner panel, as explained in greater detail below.

Sectional properties of the liftgate inner channel shown generally at 240) for the structural inner panel 214 are maximized to a predetermined amount depending on the application indicated generally at arrows 'S" (e.g., the depth is minimized to less than 50 mm, typically, to about 10 to 40 mm, preferably, 18 to 30 mm, more preferably, 20 to 28 mm, most preferably, about 25.0 mm; e.g., the cross section is minimized to less than 50 mm, typically, to about 10 to 40 mm, preferably, 18 to 30 mm, more preferably, 20 to 28 mm, most preferably, about 25.0 mm).

FIG. 5 depicts a longitudinal line, indicated at 'L', through the length of the housing 222 of the lamp assembly 210. The electrical connector 230 is located at a predetermined region a predetermined distance from longitudinal line 'L' depending on the application. Generally, the connector 230 is ideally located at a region that is defined as any distance from either end of the longitudinal line. Typically, the distance is a percentage of the length of the longitudinal line, preferably about 15% to 50% in from either end of the line, more preferably about 20% to 40% in from either end of the line most preferably about 30% in from either end of the line. No matter how long the line is, at the predetermined percentage of the distance from the end, e.g., about 30%, the connector will not be making contact with the other end of the connector in a linear fashion.

Alternatively, the inner panel 214 has a conformal surface at a predetermined location or plane, e.g., upper longitudinal plane. The low profile conformal lamp and conformal surface and material correspond and results in a greater stiffness of the D-pillar. Taking geometry and material into consideration. Preferably, "I" being the geometry, such as predetermined height, most preferably, inner region of the inner panel and liftgate. Preferably, "E" being the predetermined material, e.g., stiffness of the composition. By equation I=bh$^3$/12, for example (e.g., b=width and h=height). Preferably, "I" is no less than 20%. As to the D-pillar stiffness, typically, the pillar remains thick because of predetermined conformal surfaces on the inner panel 214 and light housing 222, which allow the light housing 222 to have shallower depth. In general, stiffness strength is a cubic relationship to the depth.

Generally, the rear lamp assembly 210 has at least one suitable predetermined light source indicated generally at 238. Preferably, the rear lamp assembly 210 is a light emitting diode (LED) lamp assembly. At least one reflector 222 is operably connected to at least one lamp housing 220, preferably, by the plurality of fasteners 224. The liftgate outer panel 216 is operably bonded to the lamp housing 220 and liftgate inner panel 214.

The housing 222 can be generally arcuate in form. Other shapes are contemplated depending on the application without departure from the scope of the present invention. Arcuate forms and entry issues are addressed by piloting features, such as a lead in on the lamp housing 222 to pilot into the correct spot.

Referring again to FIGS. 2-5 generally, the present invention reduces package depth of lamp attachment system while maintaining dimensional control and attachment integrity. Also serves to provide water tight seal for liftgate closure within bond area. Conventional lamp sub assembly itself, along with final lamp assembly to the liftgate, requires multiple purchased fasteners; whereas the present invention's integrally bonded design eliminates cost, mass and labor to assemble multiple fasteners. In addition, conventional lamp subassembly itself, along with final assembly to the liftgate, requires multiple sealing gaskets to maintain water tight sealing within lamp and to liftgate closure; whereas the present invention's integrally bonded design eliminates cost, mass and labor to assemble multiple gaskets.

Furthermore, the adhesive bond attachment method in accordance with the present invention is, preferably, robotically controlled to maintain dimensional integrity while providing necessary component retention as well as water tight sealing for lamp component and liftgate assembly.

Any of the aforementioned descriptions are adaptable for lateral connection. A lateral connection of snap directly cross car is contemplated without departure from the present invention. Lateral connection with or without snaps is contemplated without departure from the present invention. A self-fixturing clip for adhesive time to dray is contemplated without departure from the present invention. Including snaps or using snaps to hold while glue sets is contemplated without departure from the present invention. Living hinges are contemplated without departure from the present invention. Pivot rocking features are contemplated without departure from the present invention. Guidance feature to control positioning of the lamp is contemplated without departure from the present invention. Various locator pin options depending on the application are contemplated without departure from the present invention. Lead on the lamp housing to pilot into mounting location is contemplated without departure from the present invention. Predetermined angles for ease and accuracy of approach, e.g., lamp connection, is contemplated without departure from the present invention. Pivoting the lamp from the outside in is contemplated without departure from the present invention. Pivoting the lamp from the inside out is contemplated without departure from the present invention. Lamp straight in laterally is contemplated without departure from the present invention. Lamp wrap over top is contemplated without departure from the present invention. Lamp up/down is contemplated without departure from the present invention. Most preferably, the electrical connector is on the outer panel and the sealing means is on the outer panel. Preferably, guidance and float is provided. Preferably detent for serviceability is provided.

The rear lamp appliqué assembly 110,210 bonded to the liftgate outer panel, e.g., preferably adhesive bonded, has the many benefits, including, but not limited to, the following: Minimizes F/A package space by eliminating the depth required for mechanical fasteners; Minimizes F/A package space by eliminating depth required for datum pins; Eliminates piece cost for sealed mechanical fasteners; Eliminates need for accessing mechanical fasteners; Eliminates assembly cost for installing fasteners; Eliminates piece cost for gasket at electrical connector; Eliminates mass of fasteners; LED technology minimizes need for service; Service could be similar to backlight replacement; Lamp delivered PIA to module; Adhesive attachment does not prevent incandescent bulb execution—but it is not preferred.

In any of the above FIGS. 2-5, preferably a housing of the connector allows for predetermined amount of connector movement for tolerances. Preferably, the integrated lamp connection floats a predetermined amount to accommodate predetermined tolerances. Alternatively, the integrated lamp connection does not float.

Referring now to FIGS. 6-10, generally, there is provided an attached lamp without the need for adhesive or fasteners, e.g., a fully snap fit attached lamp. In addition, a self-engaging electrical lamp electrical connector to the liftgate is provided.

Figure 6:
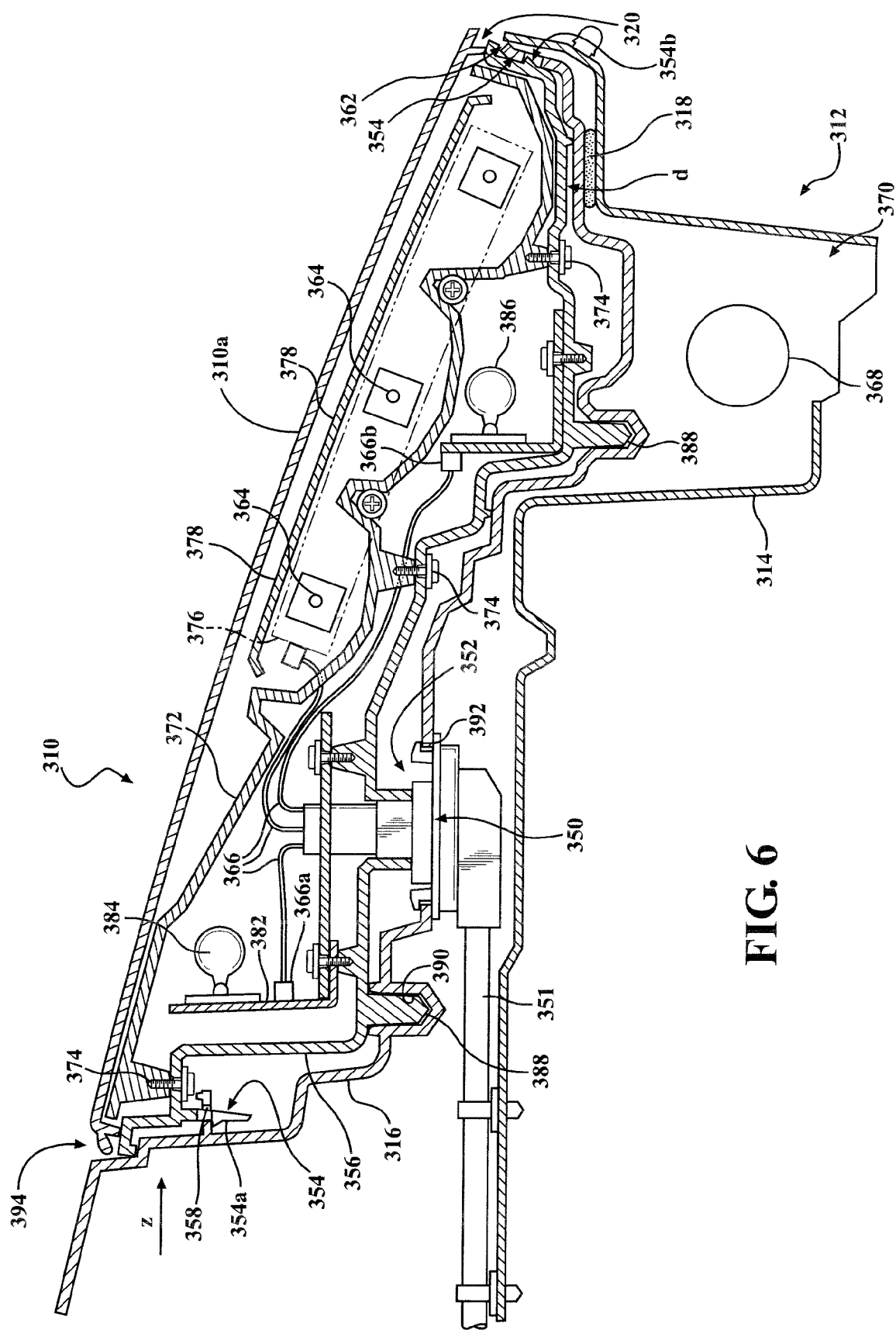
FIG. 6 is a cross sectional view of a rear lamp appliqué assembly connected to a liftgate assembly, in accordance with the present invention.

Referring now to FIG. 6, generally, an exemplary attachment of a fully snap attached lamp without the need for adhesive or fasteners is illustrated. In addition, a self-engaging electrical lamp electrical connector to liftgate is provided. There are no hand access holes. There is no need for hand access holes to connect a loose wire harness to the lamp, which is a significant advantage.

There is provided a rear lamp appliqué assembly, e.g., liftgate applique lamp, shown generally at 310, in accordance with the present invention, attached to a liftgate assembly, shown generally at 312, that includes at least an inner panel 314 and an outer panel 316. The outer panel 316 is preferably adhesive bonded 318 to the inner panel 314 creating an adhesive joint. The assembly 310 is operably attached to the liftgate outer panel 316, preferably, by operably cooperating fit features, most preferably, by snap fit.

There is provided at least one self-sealing connector shown generally at 350, most preferably, a self-sealing ¼ turn wire harness connector 350 for a wire harness 351. Each self-sealing connector 350 accepts an integrated lamp connection, indicated generally at 352, preferably a housing that allows for predetermined amount of connector movement for tolerances. Preferably, the connector 350 and/or integrated lamp connection 352 floats. Alternatively, the 350 and/or integrated lamp connection does not float. This requires no access openings, and thereby further minimizes water intrusion, which is a significant advantage. The self-sealing connector 350 is preferably a separate part and the interface is molded into the outer panel 316.

An operable sealing feature 392, e.g., detent ring, angled ring, detent ring with integrated seal, etc, of the self-sealing connector 350 connects the connector 350 to the outer panel 316 and seals there such that the outer panel 316 and connector 350 dictate movement, e.g., predetermined float, and not the inner panel 314.

The sealing feature 392 prevents movement of the connector 350 while the vehicle is traveling on the road and allows a water seal. A spring loaded detent with a line hinge or other suitable feature to allow serviceability is preferred. Preferably, the engaging function can be performed, yet enough resistance can overcome the detent. For example, a pin can be used to push through an aperture and release the detent for serviceability is contemplated without departure from the present invention.

There is further provided at least one integrated snap attachment feature shown generally at 354, more preferably, a plurality of integrated snap attachment features 354. The at least one integrated snap attachment feature 354 is operably located to connect the rear lamp appliqué assembly 310 to the liftgate outer panel 316. Thus, no added bonding, adhesive or fasteners are needed. At least one first integrated snap feature 354a is provided on the lamp assembly 310 (e.g., on a housing 356 of the assembly 310) that operably fits to at least one first corresponding receiving feature 358 (e.g., an aperture, lip, ledge, or other suitable corresponding structure to receive and retain the first snap feature 354a) provided on or integrally formed with the outer panel 316. More preferably, the first attachment feature 354a is at least one pin fit through at least one aperture 358, respectively. Most preferably, the first attachment feature 354a is at least one pin fit through at least one aperture 358, respectively, toward the outboard end of the assembly 310 with respect to the installed vehicle position. Alternatively, the inboard end of the assembly 310 with respect to the installed vehicle position. Preferably, the integrated snap feature 354a is adjacent a fulcrum region indicated generally at 394 providing an assembly pivot location. Other features suitable for attachment without bonding are contemplated depending on the application without departure from the scope of the present invention. At least one second snap feature shown generally at 354b is provided on the lamp assembly 310 (e.g., formed on the housing 356) that operably fits to at least one second corresponding receiving feature indicated generally at 362 (e.g., an aperture, lip, ledge, or other suitable corresponding structure to receive and retain the second snap feature 354b) provided on or integrally formed with the outer panel 316. Preferably, the second attachment feature 354b is at least one clip, ledge, flange, barb, and/or hook, operably snap fit into the corresponding structure that preferably extends generally vertically along the leading edge of the outboard edge of the assembly 310, e.g., that is an elongated generally vertically extending clip, ledge, flange). Most preferably, the second snap feature is a lamp snap hook.

The plurality of integrated snap attach features 354 between the liftgate applique lamp assembly 310 and liftgate outer panel 316 eliminates the need for added bonding and fasteners to attach the lamp assembly 310 to the outer panel 316. The outer panel 316 is bonded, e.g., with adhesive, to the inner panel 314.

At least one locator pin 388 is provided on the lamp assembly 310, most preferably, on the housing 356, to align to a recess or aperture 390 formed in the outer panel 316 to assist in aligning the lamp assembly 310 relative to the outer panel 316.

The assembly 310 is also preferably positioned within the outer panel's 316 pocket indicated generally at 320, to optimize fit to the liftgate assembly 312 and minimize the depth (indicated generally at 'd'). In an exemplary embodiment, the depth is minimized about 45 mm, typically, to about 10 to 45 mm, preferably, about 10 to 30 mm, more preferably, about 10 to 25.0 mm.

In an exemplary embodiment—there are no adhesives used to connect the lamp.

The wire connector 350 is operably connected to a plurality of wire jumpers 366, and a wire harness 368 within the liftgate inner channel region, indicated generally at 370 of the inner panel 314.

The rear lamp assembly 310 has at least one suitable predetermined light source 364. Preferably, the rear lamp assembly 310 is a light emitting diode (LED) lamp assembly. At least one reflector 372 is connected to the housing 356, preferably, by a plurality of fasteners 374. The plurality of light sources 364 are operably connected to a first printed circuit board 376, e.g., LED printed circuit board. At least one diffuser bezel 378 is located generally between the printed circuit board 376 and lamp lens 380. A second printed circuit board 382, e.g., LED printed circuit board, is operably connected to at least one wire jumper 366 attachment 366a and to a first light pipe portion 384. A third printed circuit board 386, e.g., LED printed circuit board, is operably connected to at least one wire jumper 366 attachment 366b and to a second light pipe portion 386.

The attachment preferably forms a pivot connection region. The wire harness connector 350 is located at a predetermined operable location depending on the application. By way of example, taking a longitudinal length of the housing 356 of the lamp assembly, the electrical connector 350 is located at a predetermined region a predetermined distance from the longitudinal axis through the housing 356 depending on the application. Generally, the connector 350 is ideally located at a region that is defined as any distance from either end of the longitudinal line. Typically, the distance is a percentage of the length of the longitudinal line, preferably about 15% to 50% in from either end of the line, more preferably about 20% to 40% in from either end of the line most preferably about 30% in from either end of the line. No matter how long the line 'L' is, at the predetermined percentage of the distance from the end, e.g., about 30%, the connector will not be making contact with the other end of the connector in a linear fashion.

Alternatively, the inner panel 312 has a conformal surface at a predetermined location or plane, e.g., upper longitudinal plane. The low profile conformal lamp and conformal surface and material correspond and results in a greater stiffness of the D-pillar. Taking geometry and material into consideration. Preferably, "I" being the geometry, such as predetermined height, most preferably, inner region of the inner panel and liftgate. Preferably, "E" being the predetermined material, e.g., stiffness of the composition. By equation I=bh$^3$/12, for example (e.g., b=width and h=height). Preferably, "I" is no less than 20%. As to the D-pillar stiffness, typically, the pillar remains thick because of predetermined conformal surfaces on the inner panel 314 and light housing 356, which allow the light housing 356 to have shallower depth. In general, stiffness strength is a cubic relationship to the depth.

Figure 7:
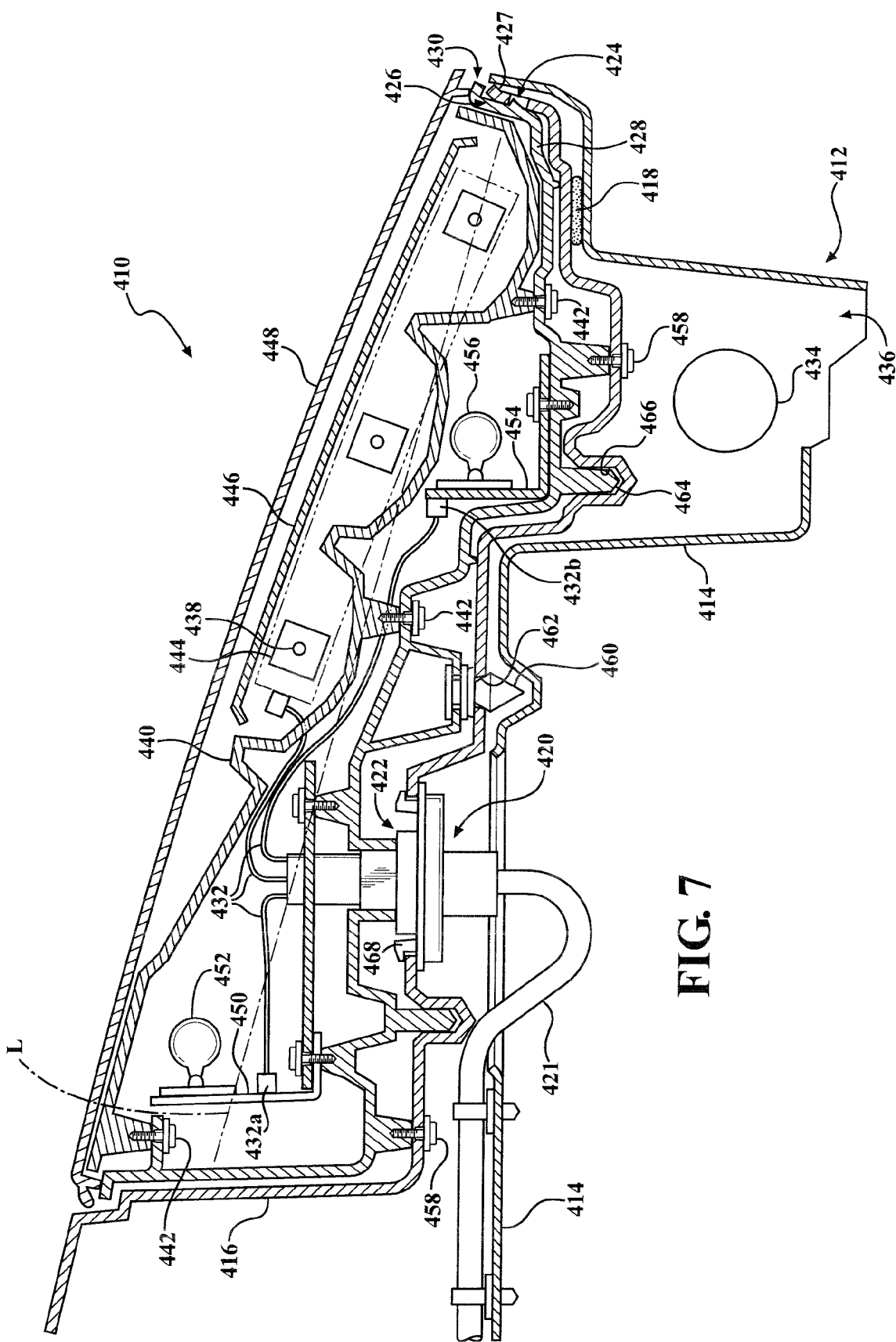
FIG. 7 is a cross sectional view of a rear lamp appliqué assembly connected to a liftgate assembly, in accordance with the present invention.

Referring now to FIG. 7, in general, an exemplary attachment of a fully snapped attached lamp without the need for adhesive or fasteners is illustrated. In addition, a self-engaging electrical lamp electrical connector to liftgate is provided. There are no hand access holes to connect a loose wire harness to the lamp, which is a significant advantage.

There is provided a rear lamp appliqué assembly shown generally at 410, e.g., liftgate applique lamp, in accordance with the present invention, attached to a liftgate assembly, shown generally at 412, that includes at least an inner panel 414 and an outer panel 416. The outer panel 416 is preferably adhesive bonded 418 to the inner panel 414. The assembly 410 is operably attached to the liftgate outer panel 416, preferably, by operably cooperating fit features, most preferably, by at least one snap fit arrangement.

There is provided at least one sealed connector shown generally at 420, e.g., self-sealing connector, most preferably, a self-sealing ¼ turn wire harness connector 420 for a wire harness 421. The self-sealing connector 420 accepts an integrated lamp connection, indicated generally at 422, preferably a housing that allows for predetermined amount of connector movement for tolerances. Preferably, the integrated lamp connection 422 floats. Alternatively, the integrated lamp connection 422 does not float. Attachment requires no access openings, and thereby further minimizes water intrusion, which is a significant advantage.

An operable sealing feature 468, e.g., detent ring, angled ring, detent ring with integrated seal, etc, of the self-sealing connector 420 connects the connector 420 to the outer panel 416 and seals there such that the outer panel 416 and connector 420 dictate movement, e.g., predetermined float, and not the inner panel 414.

The sealing feature 468 prevents movement of the connector 420 while the vehicle is traveling on the road and allows a water seal. A spring loaded detent with a line hinge or other suitable feature to allow serviceability is preferred. Preferably, the engaging function can be performed, yet enough resistance can overcome the detent. For example, a pin can be used to push through an aperture and release the detent for serviceability is contemplated without departure from the present invention. It is contemplated that an additional suitable seal is provided depending on the application without departure from the scope of the present invention.

There is further provided at least one integrated snap attachment feature shown generally at 424. The at least one integrated snap attachment feature 424 is preferably a lamp snap hook. Preferably, at least one first half, indicated generally at 426, of the integrated snap feature is provided on the lamp assembly 410, most preferably, formed on the housing 428, and at least one second half 427 of the integrated snap feature is provided on the liftgate assembly 412, most preferably, on the outer panel 416.

The integrated snap attach features 424 between the liftgate applique lamp assembly 410 and liftgate outer panel 416 eliminates the need for added bonding and fasteners to attach the lamp assembly 410 to the outer panel 416.

The assembly 410 is also preferably positioned within the outer panel's 416 pocket indicated generally at 430, to optimize fit to the liftgate assembly 412 and minimize the depth (indicated generally at 'd'). In an exemplary embodiment, the depth is minimized about 45 mm, typically, to about 10 to 45 mm, preferably, about 10 to 30 mm, more preferably, about 10 to 25.0 mm.

In an exemplary embodiment—there are no adhesives used to connect the lamp.

The wire connector 420 is operably connected to a plurality of wire jumpers 432, and a wire harness 434 provided within the liftgate inner channel region, indicated generally at 436 of the inner panel 414.

The rear lamp assembly 410 has at least one suitable predetermined light source 438. Preferably, the rear lamp assembly 410 is a light emitting diode (LED) lamp assembly. At least one reflector 440 is connected to the housing 428, preferably, by a plurality of fasteners 442. Preferably, the inboard most fastener 442 is adjacent a fulcrum region indicated generally providing an assembly pivot location. The plurality of light sources 438 are operably connected to a first printed circuit board 444, e.g., LED printed circuit board. At least one diffuser bezel 446 is located generally between the printed circuit board 444 and lamp lens 448. A second printed circuit board 450, e.g., LED printed circuit board, is operably connected to at least one wire jumper 432 attachment 432a and to a first light pipe portion 452. A third printed circuit board 454, e.g., LED printed circuit board, is operably connected to at least one wire jumper 432 attachment 432b and to a second light pipe portion 456.

A plurality of anti-theft fasteners 458 connect the lamp assembly 410 to the liftgate assembly 412. Preferably, the anti-left fasteners 458 (e.g., M6 anti-theft screws) connect the housing 428 to the outer panel 416.

At least one lamp base mounting clip 460 is also provided. The clip 460 fits through a respective aperture 462 formed in the outer panel 416. At least one locator pin 464 is provided on the lamp assembly 410, most preferably, on the housing 428, to align to a recess or aperture formed in the outer panel 416 to assist in aligning the lamp assembly 410 relative to the outer panel 416 to engage the mounting clip 460 within the aperture 462 of the outer panel and/or the lamp snap hook 424.

The attachment preferably forms a pivot connection region. The wire harness connector 420 is located at a predetermined operable location depending on the application. FIG. 7 depicts a longitudinal line, indicated at 'L', through the length of the housing 428 of the lamp assembly. The electrical connector 420 is located at a predetermined region a predetermined distance from 'L' depending on the application. Generally, the connector 420 is ideally located at a region that is defined as any distance from either end of the longitudinal line. Typically, the distance is a percentage of the length of the longitudinal line, preferably about 15% to 50% in from either end of the line, more preferably about 20% to 40% in from either end of the line most preferably about 30% in from either end of the line. No matter how long the line 'L' is, at the predetermined percentage of the distance from the end, e.g., about 30%, the connector will not be making contact with the other end of the connector in a linear fashion.

Alternatively, the inner panel 412 has a conformal surface at a predetermined location or plane, e.g., upper longitudinal plane. The low profile conformal lamp and conformal surface and material correspond and results in a greater stiffness of the D-pillar. Taking geometry and material into consideration. Preferably, "I" being the geometry, such as predetermined height, most preferably, inner region of the inner panel and liftgate. Preferably, "E" being the predetermined material, e.g., stiffness of the composition. By equation I=bh$^3$/12, for example (e.g., b=width and h=height). Preferably, "I" is no less than 20%. As to the D-pillar stiffness, typically, the pillar remains thick because of predetermined conformal surfaces on the inner panel 414 and light housing 428, which allow the light housing 428 to have shallower depth. In general, stiffness strength is a cubic relationship to the depth.

Figure 8:
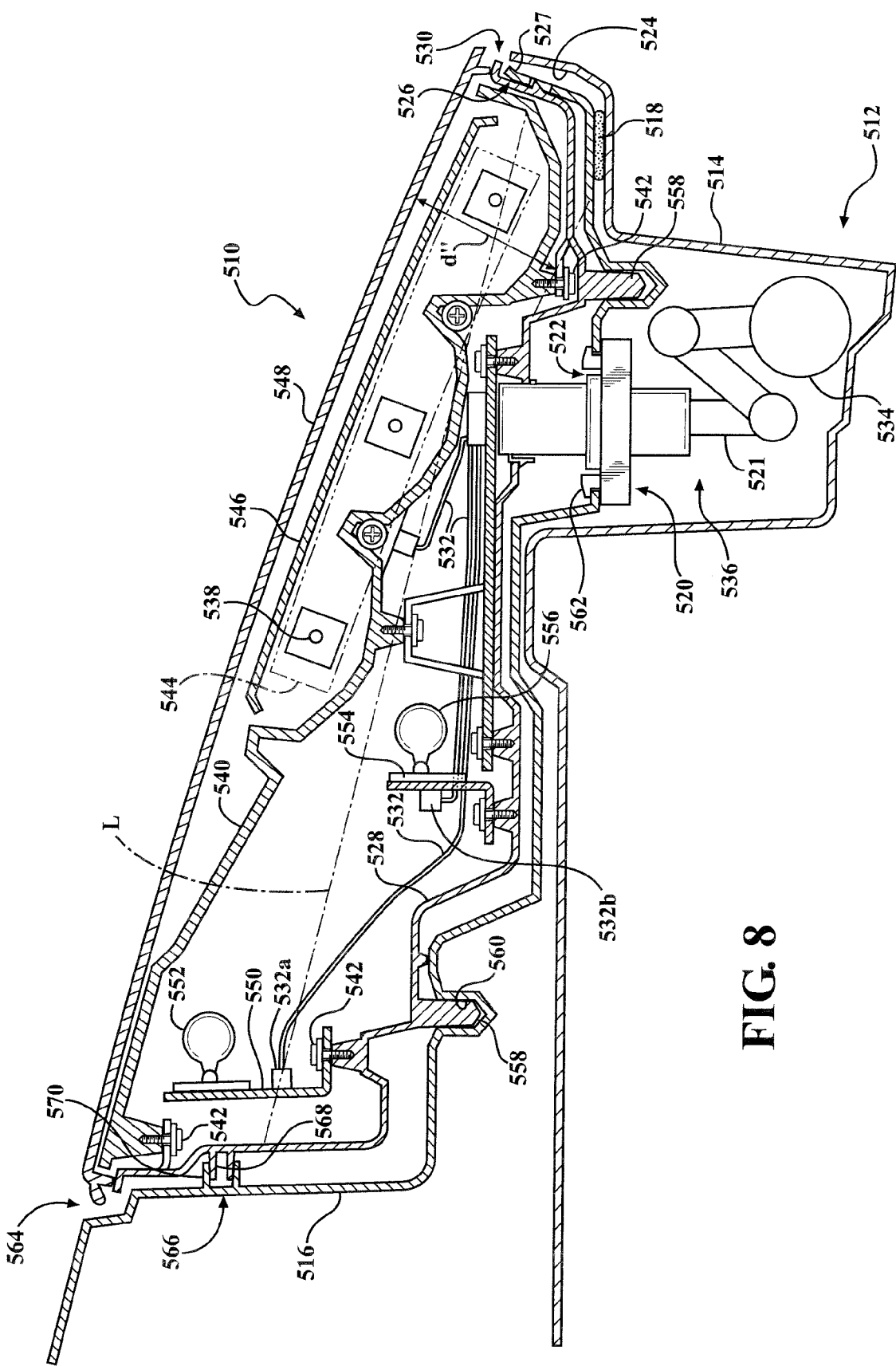
FIG. 8 is a cross sectional view of a rear lamp appliqué assembly connected to a liftgate assembly, in accordance with the present invention.

Referring now to FIG. 8, in general, an exemplary attachment of a fully snapped attached lamp without the need for adhesive or fasteners is illustrated. In addition, a self-engaging electrical lamp electrical connector to liftgate is provided. There are no hand access holes to connect a loose wire harness to the lamp, which is a significant advantage. The lamp assembly 510 is connected to a liftgate assembly 512 and includes an outboard located electrical connector depicted generally at 520, in accordance with the present invention.

There is provided a rear lamp appliqué assembly shown generally at 510, e.g., liftgate applique lamp, in accordance with the present invention, attached to a liftgate assembly, shown generally at 512, that includes at least an inner panel 514 and an outer panel 516. The outer panel 516 is preferably adhesive bonded 518 to the inner panel 514. The assembly 510 is operably attached to the liftgate outer panel 516, preferably, by operably cooperating fit features, most preferably, by at least one snap fit arrangement.

There is provided at least one sealed connector shown generally at 520, e.g., self-sealing connector, most preferably, a self-sealing ¼ turn wire harness connector 520 for a wire harness 521. The self-sealing connector 520 accepts an integrated lamp connection, indicated generally at 522, preferably a housing that allows for predetermined amount of connector movement for tolerances. Preferably, the integrated lamp connection 522 floats predetermined amounts. Alternatively, the integrated lamp connection 522 does not float. Attachment requires no access openings, and thereby further minimizes water intrusion, which is a significant advantage.

An operable sealing feature 562, e.g., detent ring, angled ring, detent ring with integrated seal, suitable detent feature with integrated seal, etc, of the self-sealing connector 520 connects the connector 520 to the outer panel 516 and seals there such that the outer panel 516 and connector 520 dictate movement, e.g., predetermined float, and not the inner panel 514.

The sealing feature 562 prevents movement of the connector 520 while the vehicle is traveling on the road and allows a water seal. A spring loaded detent with a line hinge or other suitable feature to allow serviceability is preferred. Preferably, the engaging function can be performed, yet enough resistance can overcome the detent. For example, a pin can be used to push through an aperture and release the detent for serviceability is contemplated without departure from the present invention.

There is further provided at least one integrated snap attachment feature shown generally at 524. The at least one integrated snap attachment feature 524 is preferably a lamp snap hook. Preferably, at least one first half 526 of the integrated snap feature is provided on the lamp assembly 510, most preferably, formed on the housing 528, and at least one second half 528 of the integrated snap feature is provided on the liftgate assembly 512, most preferably, on the outer panel 516.

The integrated snap attach features 524 between the liftgate applique lamp assembly 510 and liftgate outer panel 516 eliminates the need for added bonding and fasteners to attach the lamp assembly 510 to the outer panel 516.

Preferably, an integrated guide feature is provided, shown generally at 566, adjacent to a fulcrum region indicated generally at 564 providing an assembly pivot location. The guide feature includes at least one lateral flange 568 or prongs integrally formed with or connected to the housing 528, and the flange 568 fit within a respective recess or channel 570 integrally formed with or connected to the outer panel 516. Preferably, the integrated guide feature is generally inboard on the lamp assembly 512 and the lamp snap hook 524 is generally outboard on the lamp assembly 512. Other features suitable for attachment without bonding are contemplated depending on the application without departure from the scope of the present invention.

The assembly 510 is also preferably positioned within the outer panel's 516 pocket indicated generally at 530, to optimize fit to the liftgate assembly 512 and minimize the depth (indicated generally at 'd'''). In an exemplary embodiment, the depth is minimized about 45 mm, typically, to about 10 to 45 mm, preferably, about 10 to 30 mm, more preferably, about 10 to 25.0 mm.

In an exemplary embodiment—there are no adhesives used to connect the lamp.

The wire connector 520 is operably connected to a plurality of wire jumpers 532, and a wire harness 534 provided within the liftgate inner channel region, indicated generally at 536 of the inner panel 514.

The rear lamp assembly 510 has at least one suitable predetermined light source 538. Preferably, the rear lamp assembly 510 is a light emitting diode (LED) lamp assembly. At least one reflector 540 is connected to the housing 528, preferably, by a plurality of fasteners 542. The plurality of light sources 538 are operably connected to a first printed circuit board 544, e.g., LED printed circuit board. At least one diffuser bezel 546 is located generally between the printed circuit board 544 and lamp lens 548. A second printed circuit board 550, e.g., LED printed circuit board, is operably connected to at least one wire jumper 532 attachment 532a and to a first light pipe portion 552. A third printed circuit board 554, e.g., LED printed circuit board, is operably connected to at least one wire jumper 532 attachment 532b and to a second light pipe portion 556.

Optionally, a plurality of anti-theft fasteners connect the lamp assembly 510 to the liftgate assembly 512, e.g., M6 anti-theft screws connect the housing 528 to the outer panel 516.

Optionally, at least one lamp base mounting clip is also provided. The clip fits through a respective aperture formed in the outer panel 516.

At least one locator pin 588 is provided on the lamp assembly 510, most preferably, on the housing 528, to align to a recess or aperture 560 formed in the outer panel 516 to assist in aligning the lamp assembly 510 relative to the outer panel 516 to assist in engaging the lamp snap hook 524 and connector 520.

The attachment preferably forms a pivot connection region. The wire harness connector 520 is located at a predetermined operable location depending on the application. FIG. 8 depicts a longitudinal line, indicated at 'L', through the length of the housing 528 of the lamp assembly. The electrical connector 520 is located at a predetermined region a predetermined distance from 'L' depending on the application. Generally, the connector 520 is ideally located at a region that is defined as any distance from either end of the longitudinal line. Typically, the distance is a percentage of the length of the longitudinal line, preferably about 15% to 50% in from either end of the line, more preferably about 20% to 40% in from either end of the line most preferably about 30% in from either end of the line. No matter how long the line 'L' is, at the predetermined percentage of the distance from the end, e.g., about 30%, the connector will not be making contact with the other end of the connector in a linear fashion.

Alternatively, the inner panel 512 has a conformal surface at a predetermined location or plane, e.g., upper longitudinal plane. The low profile conformal lamp and conformal surface and material correspond and results in a greater stiffness of the D-pillar. Taking geometry and material into consideration. Preferably, "I" being the geometry, such as predetermined height, most preferably, inner region of the inner panel and liftgate. Preferably, "E" being the predetermined material, e.g., stiffness of the composition. By equation I=bh³/12, for example (e.g., b=width and h=height). Preferably, "I" is no less than 20%. As to the D-pillar stiffness, typically, the pillar remains thick because of predetermined conformal surfaces on the inner panel 314 and light housing 528, which allow the light housing 528 to have shallower depth. In general, stiffness strength is a cubic relationship to the depth.

Figure 9:
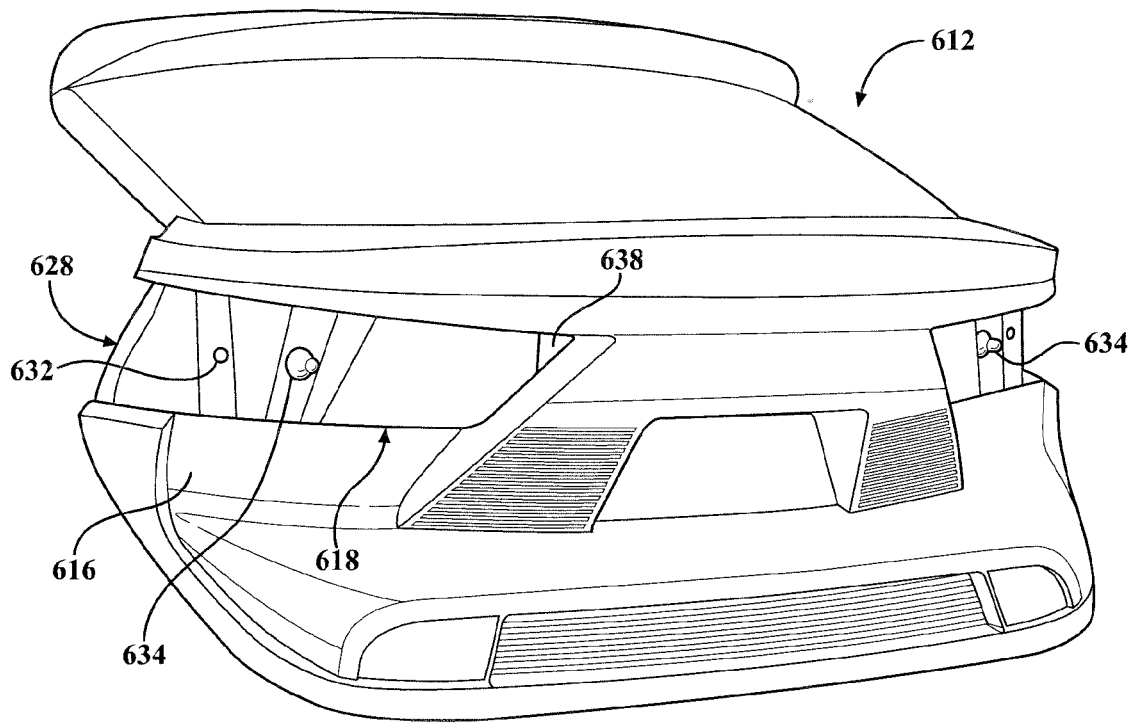
FIG. 9 is a perspective view of a conforming surface of a liftgate assembly including a pivot, locator, and electrical connector and lamp attachment feature, in accordance with the present invention.
Figure 10:
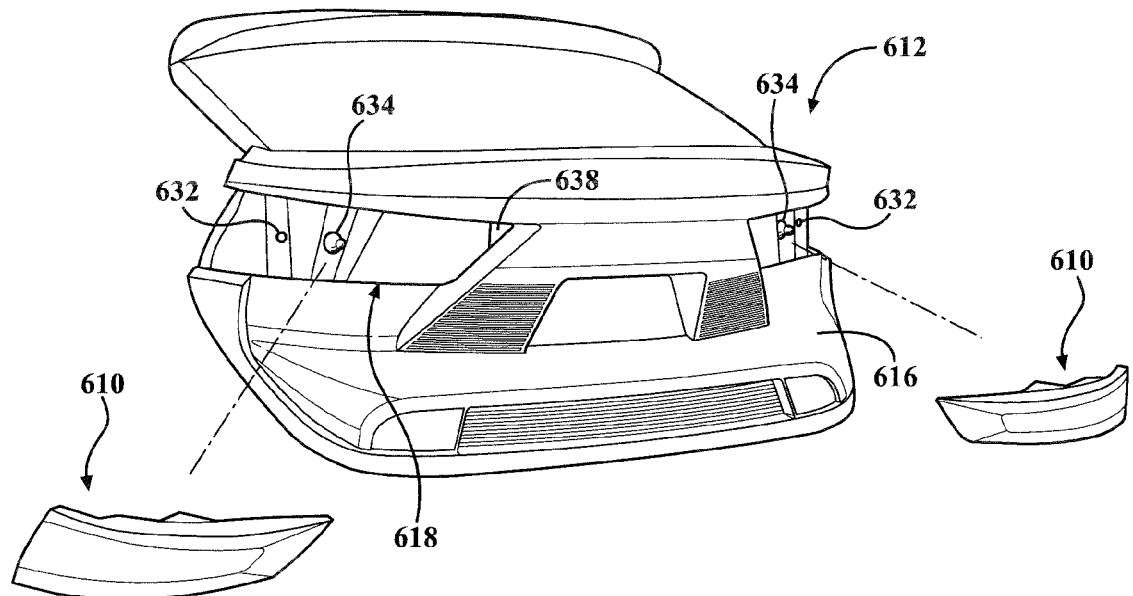
FIG. 10 is an exploded perspective view of the liftgate assembly with conforming surfaces and rear lamp appliqué assemblies, in accordance with the present invention.
Figure 11:
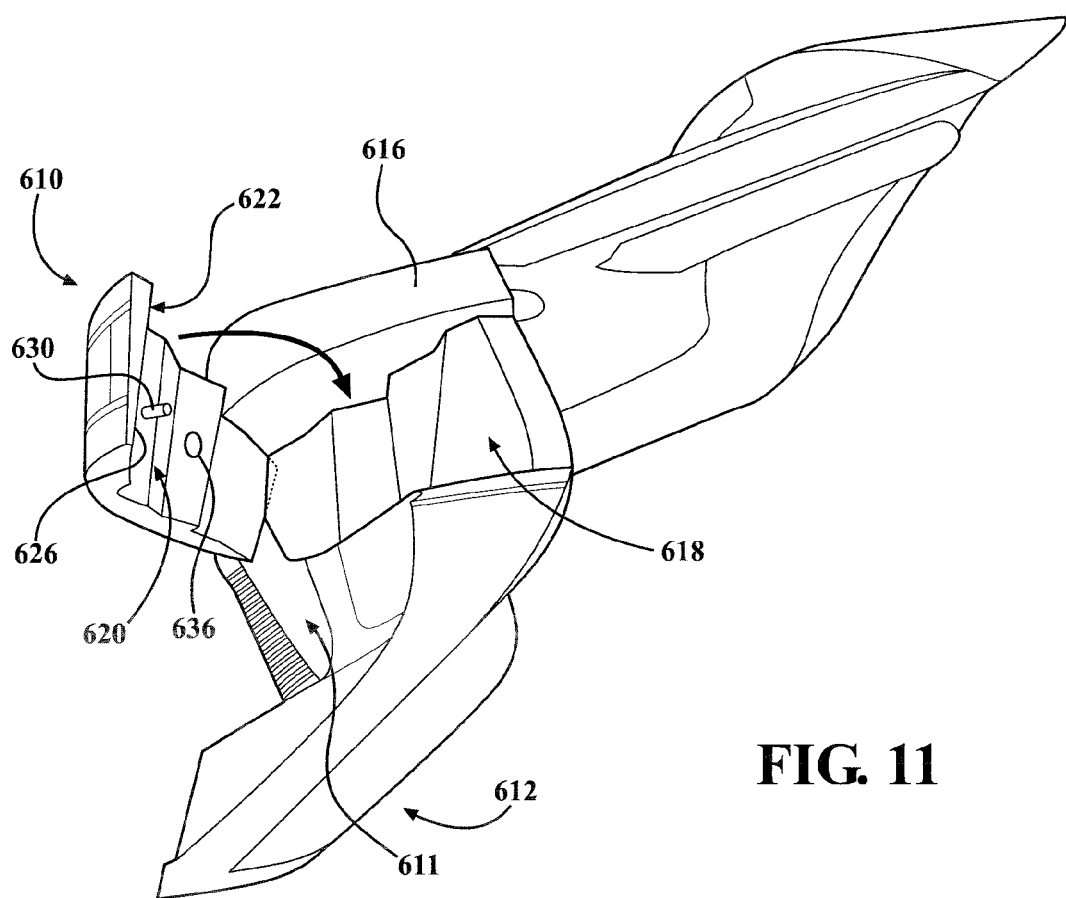
FIG. 11 is a perspective view of the rear lamp appliqué assembly pivoting to connection to the liftgate assembly depicting conforming surfaces, in accordance with the present invention.

Referring now more particularly to FIGS. 9-11 there is illustrated an exemplary lamp assembly 610 and installation in accordance with, and adaptable for any, of the aforementioned descriptions and FIGS. 2-8. An exemplary attachment of a fully snap attached lamp without the need for adhesive or fasteners to connect the lamp to the liftgate is illustrated. In addition, a self-engaging electrical lamp electrical connector to liftgate is provided. There are no hand access holes. There is no need for hand access holes to connect a loose wire harness to the lamp, which is a significant advantage.

There is provided the rear lamp appliqué assembly, e.g., liftgate applique lamp, shown generally at 610, in accordance with the present invention, attached to a liftgate assembly, shown generally at 612, that includes at least an inner panel and at least one outer panel 616. The outer panel 616 is preferably adhesive bonded to the inner panel 614 creating an adhesive joint. The assembly 610 is operably attached to the liftgate outer panel 616, preferably, by operably cooperating fit features, most preferably, by snap fit.

The liftgate assembly 610 includes a pocket indicated generally at 611 with a conforming surface indicated generally at 618, the lamp 610 having a corresponding conforming surface indicated generally at 620. At least one first conforming surface 618 is provided on the liftgate panel that coincides with at least one second conforming surface 620 provided on the lamp assembly 610.

There is further provided at least one integrated snap attachment feature. The at least one integrated snap attachment feature is preferably a lamp snap hook, as described previously. Preferably, at least one first half, indicated generally at 622, of the integrated snap feature is provided on the lamp assembly 610, most preferably, formed on the housing 626, and at least one second half, shown generally at 628, of the integrated snap feature is provided on the liftgate assembly 612, most preferably, on the outer panel 616. The integrated snap attach features eliminates the need for added bonding and fasteners to attach the lamp assembly 610 to the outer panel 616.

At least one locator pin 630 is provided on the second conforming surface 620 of the lamp 610. Alternatively, the at least one locator pin 630 is located on the first conforming surface 618. A corresponding aperture 632 or recess is provided on the other conforming surface, e.g., first conforming surface 618, to receive the locator pin 630. Alternatively, a plurality of locator pins are located on the first and/or second conforming surfaces 618 and/or 620 and corresponding recesses or apertures provided on the other of the first and/or second conforming surface.

An electrical connector 634, in accordance with the present invention and described previously, is provided on the first conforming surface 618 of the outer panel 616. Alternatively, the electrical connector 634 is located on the second conforming surface 620. A corresponding aperture 636 or recess is provided on the other conforming surface, e.g., second conforming surface 620, to receive the electrical connector 634.

An assembly pivot 638 or fulcrum is provided, most preferably at the inboard corner of the conforming surface.

To install the lamp assembly 610, the inboard side of the assembly 610 is brought into alignment with the assembly pivot 638 (See FIG. 11), the assembly 610 is then rotated toward the first conforming surface 618, which brings the lamp assembly 610 toward the outer panel 616 for closing the pocket 611 off as the outboard end of the second conforming surface 620 of the lamp assembly 610 gets closer to the outboard end of the first conforming surface 618. During the pivot movement (indicted by arrow in FIG. 11), the standup electronic connector 634 engages the aperture 636 of the lamp assembly 610 housing 626 and the locator 630 engages the aperture 632 of the conforming surface 618 of the liftgate assembly 612. At the end of the pivot movement, the integrated snap feature 622, e.g., clip, and corresponding integrated snap feature 628 connect, thereby completing the connection of the lamp assembly 610 to the liftgate assembly 612. Thus, the pivot movement is generally from inboard to outboard. Alternatively, the assembly pivot 638 is provided on the outboard end and the pivot movement is generally outboard toward inboard with respect to the liftgate 612.

Referring to FIGS. 2-11 generally, in particular to FIGS. 6-11, preferably, the electronic connector is provided on the outer panel, provides a sealing means on the outer panel, remains with the outer panel, provides guidance and float for assembly of the lamp, and provides detent as well as allows serviceability.

By way of example, one half of the connector is built into the liftgate assembly with a water seal that seals this connector to the surface of the liftgate outer panel and presents a self-piloting feature that would 'find' the mating connector on the lamp-applique. The liftgate connector provides enough resistance during connection to trigger a snap feature (either on the itself or the mating connector) to form a detent (e.g., at least one ring feature with ramped or angled edges to still allow for lamp serviceability; e.g., key operator pushes on detent to release lamp) and prevent normal over the road forcing functions and liftgate slam energy from wearing or exposing the connector pins and sockets. The connector detent would also maintain the orientation of the connector pair such that the water and dust seals would function permanently. E.g., the mating connector housing would most likely be formed as part of the lamp or applique. The connector would have to allow disconnection if a high enough force was applied to it during lamp or applique removal for service. One benefit is to create a lighting package solution that optimizes the structure of the liftgate. Liftgate lamps or appliques typically live in a region of the liftgate that is extremely package limited, just below the belt line, and pose an enormous challenge to design a liftgate with sufficient stiffness to meet the intended purpose. The lamp with the conformal shape allows a significant increase in the depth (in a horizontal plane) of the liftgate structure. The depth has a cubic relationship to stiffness and every millimeter counts. D-pillar strength.

Referring further to FIGS. 6-11, any of the aforementioned descriptions are adaptable for lateral connection. A lateral connection of snap directly cross car is contemplated without departure from the present invention. Lateral connection with or without snaps is contemplated without departure from the present invention. A self-fixturing clip for adhesive time to dray is contemplated without departure from the present invention. Including snaps or using snaps to hold while glue sets is contemplated without departure from the present invention. Living hinges are contemplated without departure from the present invention. Pivot rocking features are contemplated without departure from the present invention. Guidance feature to control positioning of the lamp is contemplated without departure from the present invention. Various locator pin options depending on the application are contemplated without departure from the present invention. Lead on the lamp housing to pilot into mounting location is contemplated without departure from the present invention. Predetermined angles for ease and accuracy of approach, e.g., lamp connection, is contemplated without departure from the present invention. Pivoting the lamp from the outside in is contemplated without departure from the present invention. Pivoting the lamp from the inside out is contemplated without departure from the present invention. Lamp straight in laterally is contemplated without departure from the present invention. Lamp wrap over top is contemplated without departure from the present invention. Lamp up/down is contemplated without departure from the present invention. Most preferably, the electrical connector is on the outer panel and the sealing means is on the outer panel. Preferably, guidance and float is provided. Preferably detent for serviceability is provided.

Referring to the FIGS. 2-11 generally, it is understood that any other shape and geometry suitable for a rear lamp assembly connected to a liftgate assembly is contemplated depending on the application without departure from the scope of the present invention. The present invention is adaptable to any liftgate assembly with a rear lamp assembly depending on the application without departure from the scope of the present invention. While a rear lamp assembly and liftgate assembly are shown, it is understood that the present invention is adaptable for use with any other vehicle component, including, but not limited to, front lamp assemblies, side, etc, without departure from the scope of the present invention. It is understood that alternative bonding methods, e.g., infrared welding, ultrasonic, etc and any suitable method are contemplated depending on the application without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A liftgate with integrated light assembly, comprising:
at least one first panel coupled to at least one second panel;
a rear lamp applique assembly coupled to said first panel;
a housing of said rear lamp applique including at least one first attachment surface;
a second attachment surface provided on said at least one first panel conforming to said at least one first attachment surface,
at least one reflector of said rear lamp applique connected to said housing;
at least one lighting source of said rear lamp applique operably coupled to said at least one reflector;
at least one self-sealing connector operable to connect a wire harness to said housing of said rear lamp applique and creating a weather resistant seal without gaskets between said rear lamp applique and said first panel.

2. The liftgate with integrated light assembly of claim 1, further comprising at least one integrated snap attachment feature connecting the rear lamp applique housing to said first panel.

3. The liftgate with integrated light assembly of claim 1, further comprising an inboard assembly pivot and at least one locator to guide the conforming first and second attachment surfaces together to automatically engage said at least one locator and provide active connecting of said self-sealing connector into an assembled position.

4. The liftgate with integrated light assembly of claim 1, wherein the first panel is bonded to the second panel using adhesive.

5. The liftgate with integrated light assembly of claim 1, wherein the rear lamp applique assembly is connected to said first panel with adhesive around the periphery of said housing providing both attachment and water tight sealing within a bond path area.

6. The liftgate with integrated light assembly of claim 1, further comprising a light emitting diode circuit board and a diffuser bezel coupled to said reflector adjacent to a lamp lens.

7. The liftgate with integrated light assembly of claim 1, further comprising at least one anti-theft fastener connecting a housing of said rear lamp applique to said first panel.

8. The liftgate with integrated light assembly of claim 1, wherein said self-sealing connector includes a sealing feature incorporating a detent to selectively connect said self-sealing connector to said first panel and allow a water tight seal.

9. The liftgate with integrated light assembly of claim 1, wherein said self-sealing connector incorporates a detent ring and allows a predetermined amount of float for tolerance variations during installation to the first panel.

10. The liftgate with integrated light assembly of claim 1, further comprising a plurality of locator pins incorporated with said rear lamp applique to align to respective recesses in said first panel for guiding installation of said rear lamp applique to said liftgate.

11. The liftgate with integrated light assembly of claim 1, further comprising at least one mounting clip to align to and extend through an aperture of said first panel for guiding installation of said rear lamp applique to said liftgate.

12. The liftgate with integrated light assembly of claim 1, wherein said self-sealing connector is a lateral connector that eliminates hand access installation holes and allows a water tight seal.

13. The liftgate with integrated light assembly of claim 1, wherein the self-sealing connector is a self-sealing ¼ turn wire harness connector coupled to said first panel, a wire harness, and which connects to an integrated lamp connector, wherein the connector is a lateral connector, straight connector connection, or said housing pivots to a linear connection.

14. The liftgate with integrated light assembly of claim 1, wherein the rear lamp applique is attached to said first panel without adhesive.

15. The liftgate with integrated light assembly of claim 1, wherein the rear lamp applique is positioned within a pocket of said liftgate and a depth is minimized to less than about 50 millimeters from a surface of said housing to allow maximum section depth for said second panel to maximize stiffness of said liftgate.

16. The liftgate with integrated light assembly of claim 1, wherein the housing of the rear lamp applique is a predetermined length and the self-sealing connector is located at a region that is a predetermined percentage of the length of a longitudinal length line through said housing, wherein a distance from said longitudinal length line is about 20 to 40 percent from either end of the line.

17. A liftgate with integrated light assembly, comprising:
at least one first panel bonded to at least one second panel;
at least one rear lamp applique housing with at least one first conforming attachment surface that correlates to at least one second conforming attachment surface of said first panel;
at least one integrated snap attachment feature that connects the rear lamp applique housing to said first panel without threaded attachments, datum pins and adhesive;
a connector operable to connect a wire harness to said rear lamp applique without requiring an access panel and creating a weather resistant seal without gaskets between said rear lamp applique and said first panel; and
wherein the connector is a lateral connector, a straight connector connection, or said housing pivots to a linear connection.

18. The liftgate with integrated light assembly of claim 17, wherein the housing of the rear lamp applique is a predetermined length and the connector is located at a region that is a predetermined percentage of the length of a longitudinal length line through said housing, wherein a distance from said longitudinal length line is about 15 to 50 percent from either end of the line to maximize strengthening structural properties of said liftgate.

19. A liftgate assembly, comprising:
at least one first panel coupled to at least one second panel;
at least one rear lamp applique housing with at least one first conforming surface and a plurality of attachment features to allow connection to said first panel;
at least one integrated lamp snap hook connecting the rear lamp applique housing to said first panel;
at least one assembly pivot region operable to guide movement of said housing;
at least one self-engaging connector operable to connect a wire harness to said rear lamp applique;
wherein the housing of the rear lamp applique is a predetermined length and the connector is located at a region that is a predetermined percentage of the length of a longitudinal length line through said housing, wherein a distance from said longitudinal length line is about 15 to 50 percent from either end of the line; and
wherein the first conforming surface on the rear lamp applique aligns to a conforming surface on the liftgate assembly during pivotal movement of said rear lamp applique housing to operably guide said housing to an assembled position to the first panel such that active connection is done with the assembly of the rear lamp applique into position with respect to said first panel.

* * * * *